United States Patent
Hubbard et al.

(10) Patent No.: US 10,829,210 B2
(45) Date of Patent: Nov. 10, 2020

(54) BRAKING SYSTEM FOR A DUAL LANDING GEAR AIRCRAFT

(71) Applicant: The Boeing Company, Chicago, IL (US)

(72) Inventors: Taylor R. Hubbard, Seattle, WA (US); David T. Yamamoto, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 177 days.

(21) Appl. No.: 16/019,729

(22) Filed: Jun. 27, 2018

(65) Prior Publication Data

US 2020/0001984 A1    Jan. 2, 2020

(51) Int. Cl.
| | |
|---|---|
| *B64C 25/42* | (2006.01) |
| *F15B 13/02* | (2006.01) |
| *F15B 13/04* | (2006.01) |
| *F15B 13/042* | (2006.01) |
| *B60T 13/12* | (2006.01) |

(52) U.S. Cl.
CPC ............ *B64C 25/42* (2013.01); *F15B 13/028* (2013.01); *F15B 13/0401* (2013.01); *F15B 13/042* (2013.01); *B60T 13/12* (2013.01); *B60T 2270/40* (2013.01); *F15B 2211/3052* (2013.01)

(58) Field of Classification Search
CPC .. F15B 13/028; F15B 13/0401; F15B 13/042; F15B 2211/3052; B60T 13/12; B60T 2270/40; B60T 8/1703; B60T 7/042; B60T 8/325
See application file for complete search history.

(56) References Cited

U.S. PATENT DOCUMENTS

| | | | |
|---|---|---|---|
| 7,317,981 B2* | 1/2008 | Evans | B60T 8/1703 |
| | | | 701/3 |
| 7,401,869 B2 | 7/2008 | Mallevais et al. | |
| 8,229,641 B2* | 7/2012 | Clothier | B60T 8/1703 |
| | | | 180/197 |
| 9,108,602 B2 | 8/2015 | Griffith et al. | |
| 9,656,641 B2* | 5/2017 | Griffith | B60T 7/042 |
| 9,950,699 B2 | 4/2018 | Kanemori et al. | |

(Continued)

FOREIGN PATENT DOCUMENTS

| | | |
|---|---|---|
| EP | 1547918 A1 | 6/2005 |
| EP | 2772428 A1 | 9/2014 |

(Continued)

OTHER PUBLICATIONS

EP Search Report dated Nov. 22, 2019 in re EP Application No. 19182722.9.

*Primary Examiner* — Melanie Torres Williams

(74) *Attorney, Agent, or Firm* — Coats & Bennett, PLLC

(57) ABSTRACT

A braking system for use with a dual landing gear aircraft. The braking system pairs outboard brake control into an outboard brake system control unit (BSCU) and inboard brake control into a second inboard brake system control unit (BSCU). Each BSCU is designed with two independent control lanes in which the forward wheel set is paired in one control lane and the aft wheels are paired onto the other. Alternate braking is provided via an alternate brake module installed in a fore-aft wheel pairing.

20 Claims, 7 Drawing Sheets

(56) References Cited

U.S. PATENT DOCUMENTS

2005/0247529 A1* 11/2005 Gaines .................. F16D 65/18
                                                                  188/72.8
2016/0009385 A1    1/2016  Van Deventer et al.
2018/0022440 A1    1/2018  Joseph et al.

FOREIGN PATENT DOCUMENTS

EP        2871104 A1    5/2015
EP        3279045 A1    2/2018
FR        2500798 A1    9/1982

\* cited by examiner

BRAKING SYSTEM FOR A DUAL LANDING GEAR AIRCRAFT

TECHNOLOGICAL FIELD

The present disclosure generally relates to braking systems for aircraft, and more specifically, to a brake pairing scheme for dual landing gear aircraft that creates a straightforward and robust braking system.

BACKGROUND

Aircraft can include dual landing gear architectures that include multiple wheel sets. Each wheel set includes the wheels arranged in two or more inboard wheels and two or more outboard wheels. The wheels were further arranged in sets of fore wheels that are closer to the front of the aircraft and aft wheels towards the rear of the aircraft.

Conventional braking systems divided the aircraft into a left braking system and a right braking system. Failures in these conventional systems resulted in asymmetric loss of braking in which the brakes were applied along just one side of the aircraft. This caused increased pilot work load, and could also prevent subsequent dispatch of the aircraft. These conventional systems often also included complex and costly redundancy and monitoring systems.

Thus there is a need for aircraft braking systems that reduce and/or prevent asymmetric loss of braking.

SUMMARY

The present application is directed to a braking system for an aircraft. The braking system is configured to provide for symmetrical braking of the wheels of the aircraft.

One aspect is directed to a braking system for a dual landing gear aircraft including left and right landing gears each with fore and aft inboard wheels and fore and aft outboard wheels. The braking system includes an outboard brake system control unit with at least a first processing circuit that generates brake control signals to symmetrically control braking of a first wheel pair including just the outboard fore wheels and a second wheel pair including just the outboard aft wheels in response to pilot input. An inboard brake system control unit includes at least a second processing circuit that generates brake control signals to symmetrically control braking of a third wheel pair including just the inboard fore wheels and a fourth wheel pair including just the inboard aft wheels in response to the pilot input. The inboard brake system control unit is independent from the outboard brake system control unit. A hydraulic system applies braking forces to the wheels in response to the brake control signals.

In one aspect, the outboard brake system control unit transmits the brake control signals along a first control lane to brake just the outboard fore wheels of both the left and right landing gears and transmits the brake control signals along a second control lane to brake just the outboard aft wheels of both the left and right landing gears with the first control lane being independent from the second control lane.

In one aspect, the inboard brake system control unit transmits the brake control signals along a third control lane to brake just the inboard fore wheels of both the left and right landing gears and transmits the brake control signals along a fourth control lane to brake just the inboard aft wheels of both the left and right landing gears with the third control lane being independent from the fourth control lane.

In one aspect, the inboard and outboard braking system control units further include input interfaces configured to receive the pilot input with the pilot input comprising separate first and second inputs.

In one aspect, the hydraulic system includes first hydraulic lines and alternate lines that supply hydraulic fluid to brakes at the wheels, servo-valves positioned along the first hydraulic lines and the alternate lines to modulate the pressure of the hydraulic fluid supplied to the brakes in response to the brake control signals received from the first and second brake system control units, shuttle valves that operatively connect the first hydraulic lines and the alternate lines with the shuttle valves configured to supply hydraulic fluid from one of the first hydraulic lines and the alternate lines.

In one aspect, each of the servo-valves positioned along the first hydraulic lines modulate pressure to one of the brakes and the servo-valves positioned along the alternate supply lines modulate pressure to a pair of the brakes on one of the left and right landing gears.

In one aspect, a first module houses each of the servo-valves that modulate the pressure of the hydraulic fluid along the first hydraulic lines to the brakes of one of the left and right landing gears and a second module that houses each of the servo-valves that modulate the pressure of the hydraulic fluid along the first hydraulic lines to the brakes of the other of the left and right landing gears.

In one aspect, each of the first and second modules include a shut-off valve to reduce leakage of the hydraulic fluid.

In one aspect, the outboard brake system control unit controls the servo-valves that supply hydraulic fluid to each of the fore and aft outboard wheels and the inboard brake system control unit controls the servo-valves that supply hydraulic fluid to each of the fore and aft inboard wheels.

One aspect is directed to an aircraft with a braking system that includes an outboard brake system control unit with at least a first processing circuit that generates brake control signals to symmetrically control braking of a first wheel pair including just the outboard fore wheels and a second wheel pair including just the outboard aft wheels in response to pilot input. The braking system includes an inboard brake system control unit includes at least a second processing circuit that generates brake control signals to symmetrically control braking of a third wheel pair including just the inboard fore wheels and a fourth wheel pair including just the inboard aft wheels in response to the pilot input. The inboard brake system control unit is independent from the outboard brake system control unit. The braking system includes a hydraulic system applies braking forces to the wheels in response to the brake control signals.

One aspect is directed to a braking system for a dual landing gear aircraft with left and right landing gears each with fore and aft inboard wheels and fore and aft outboard wheels. The braking system includes a hydraulic system with a plurality of supply lines that each supply hydraulic fluid to control braking of one of the wheels. Each of the supply lines includes a plurality of valves, and a brake to apply a braking force to one of the wheels. The braking system includes an outboard brake system control unit with a first processing circuit that generates brake control signals to control the valves of a first wheel pair with just the outboard fore wheels and the valves of a second wheel pair with just the outboard aft wheels in response to pilot input. An inboard brake system control unit includes a second processing circuit that generates brake control signals to control the valves of a third wheel pair with just the inboard fore wheels and the valves of a fourth wheel pair with just the inboard aft wheels. The outboard and inboard brake system control units receive pilot input and control the valves of each of the wheel pairs to apply a symmetrical braking force to the wheels of each of the wheel pairs.

In one aspect, a first control lane extends between the outboard brake system control unit and one of the valves on one of the supply lines of the outboard fore wheels, a second control lane extends between the outboard brake system control unit and one of the valves on one of the supply lines of the outboard aft wheels, a third control lane extends between the inboard brake system control unit and one of the valves on one of the supply lines of the inboard fore wheels, and a fourth control lane extends between the inboard brake system control unit and one of the valves on one of the supply lines of the inboard aft wheels with each of the control lanes being independent of each other.

In one aspect, the hydraulic system includes a first hydraulic supply line and an alternate hydraulic supply line and each of the supply lines further include a shuttle valve to selectively deliver the hydraulic fluid to the brakes from one of the first hydraulic supply line and the alternate hydraulic supply line based on the pilot input.

In one aspect, each of the inboard and outboard brake system control units receives the pilot input from both first and second pilots.

One aspect is directed to a method of braking an aircraft. The method includes receiving pilot input at both an outboard brake system control unit and an inboard brake system control unit. The method includes based on the pilot input, sending first braking signals from the outboard brake system control unit and symmetrically braking a first pair of fore outboard wheels of a right landing gear and a left landing gear and a second pair of aft outboard wheels on the right landing gear and the left landing gear. The method includes based on the pilot input, sending second braking signals from the inboard brake system control unit and symmetrically braking a third pair of aft inboard wheels of the right landing gear and the left landing gear and a fourth pair of aft inboard wheels on the right landing gear and the left landing gear.

In one aspect, the method includes sending the first braking signals to the first pair of fore outboard wheels from the outboard brake system control unit via a first control lane and sending the first braking signals from the outboard brake system control unit to the second pair of aft outboard wheels via an independent second control lane.

In one aspect, the method includes sending the second braking signals to the third pair of fore inboard wheels from the inboard brake system control unit via a third control lane and sending the second braking signals from the inboard brake system control unit to the fourth pair of aft inboard wheels from the inboard brake system control unit via an independent fourth control lane.

In one aspect, the method includes determining from the pilot input a greater of a first input and a second input and based on the greater of the first and second inputs sending the first braking signals from the outboard brake system control unit and symmetrically braking the first and second pairs of outboard wheels and based on the greater of the first and second inputs sending the second braking signals from the inboard brake system control unit and symmetrically braking the third and fourth pairs of inboard wheels.

In one aspect, the method includes determining from the pilot input a lesser of the brake command between the forward and aft wheel pair and controlling alternate braking based on the lesser of the brake command between the forward and aft wheel pair.

In one aspect, the method includes sending the braking signals to servo-valves and adjusting a flow of hydraulic fluid and adjusting the braking of the pairs of brakes.

DETAILED DESCRIPTION

The present application is directed to a braking system for use with a dual landing gear aircraft. The braking system pairs outboard brake control into an outboard brake system control unit (BSCU) and inboard brake control into a second inboard brake system control unit (BSCU). Each BSCU is designed with two independent control lanes in which the forward wheel set is paired in one control lane and the aft wheels are paired onto the other. Locked wheel and hydroplane protection is provided by communication between control lanes within a given BSCU. Alternate braking is provided via an alternate brake module installed in a fore-aft wheel pairing and is commanded via a shared controlled lane with each BSCU. The architecture optimally blends the preferred inboard/outboard architecture while maintaining control valves in close proximity to the brakes.

Each BSCU receives braking control signals from pedals from first and second pilots. The BSCU logic is such that the greater of the first and second pilot commands is selected when applying the brakes at below the skid pressure of the tire. Above the skid pressure of the tire, the brake command is generated via an antiskid function. Alternate brake control commands are generated using the lesser of the brake commands between the forward and aft wheel pair.

Figure 1:
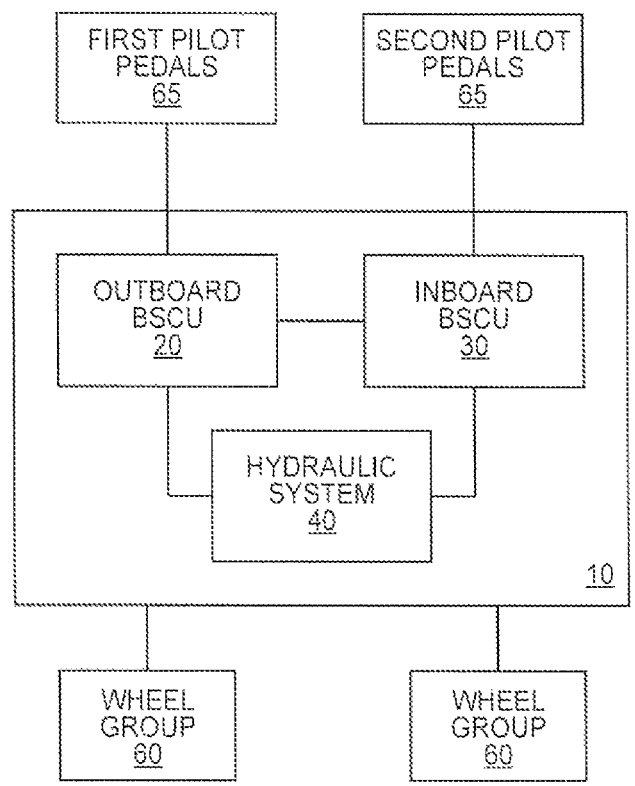
FIG. 1 is a schematic diagram of a braking system.

FIG. 1 is a schematic representation of a braking system 10 for an aircraft having a pair of wheel groups 60. The braking system 10 includes an outboard BSCU 20 and an inboard BSCU 30. Each of the outboard and inboard BSCU 20, 30 receives inputs from brake pedals 65 from the pilots. The outboard and inboard BSCUs 20, 30 independently generate and apply brake actuator control signals to a hydraulic system 40 to independently control brakes on the wheels 69 of the wheel groups 60 of the aircraft.

Figure 2:
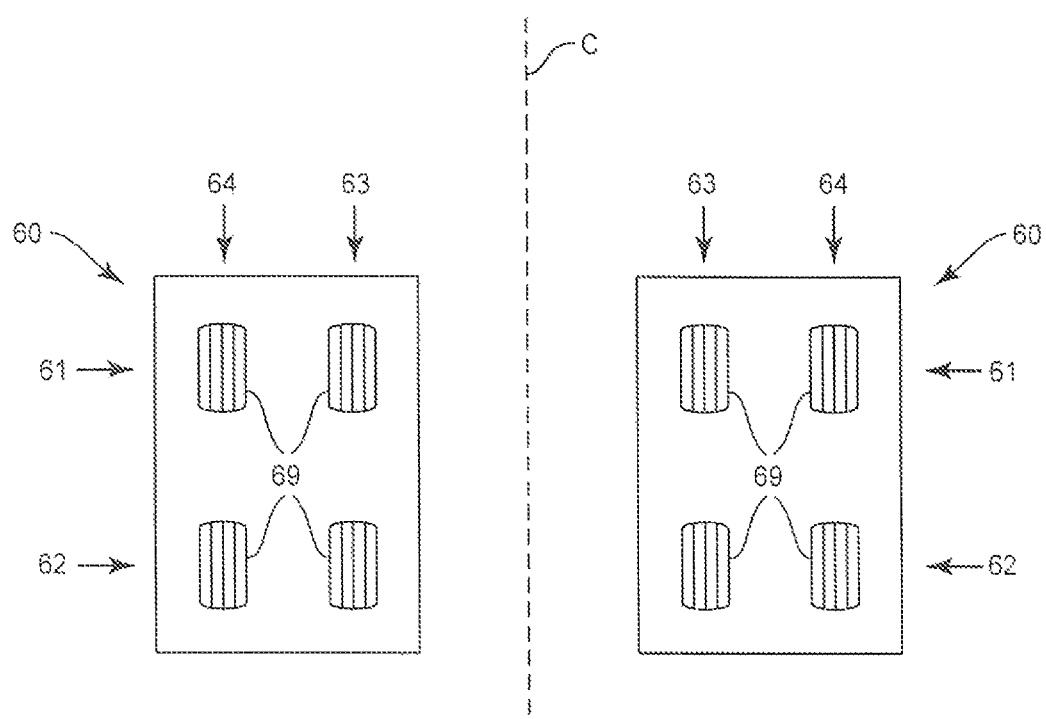
FIG. 2 is a schematic diagram of a dual landing gear with a pair of wheel groups on opposing sides of a longitudinal axis.

The braking system 10 is configured for use with an aircraft having a landing gear with dual wheel groups 60 as illustrated in FIG. 2. The wheel groups 60 can be positioned on opposing sides (i.e., right and left sides) of a longitudinal centerline C of the aircraft. Additionally or alternatively, the wheel groups 60 can be positioned on the same side of the longitudinal centerline C. Each wheel group 60 is depicted in a two-dimensional array having a row 61 of two or more fore wheels 69 and a row 62 of two or more aft wheels 69.

The wheel groups 60 are also aligned to include an inboard row 63 of two or more wheels 69 that are in closer proximity to the centerline C than an outboard row 64 that are farther from the centerline C. The wheel groups 60 can include a variety of arrangements, including but not limited to one or more rows of three of more wheels 69.

Figure 3:
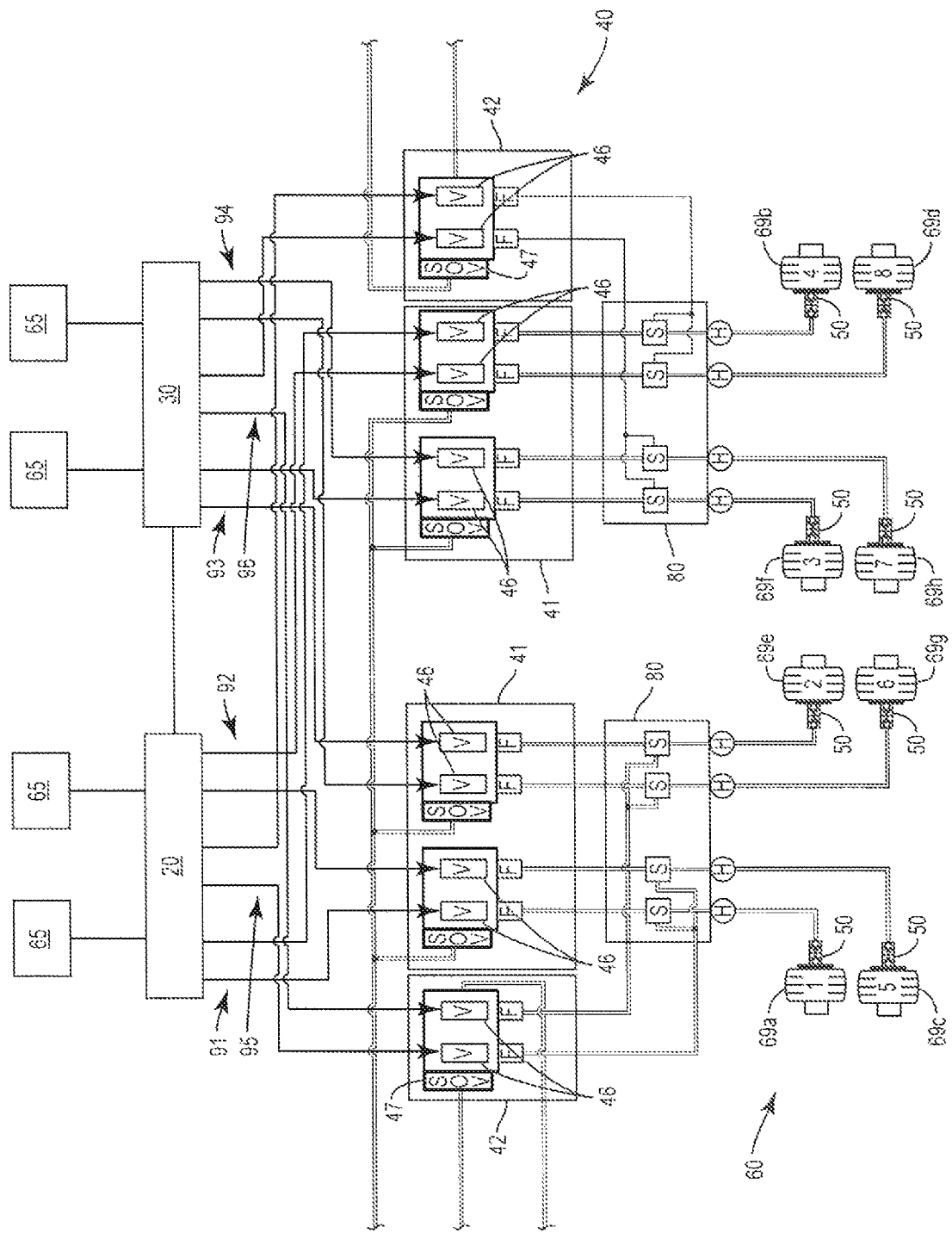
FIG. 3 is a schematic diagram of a braking system that receives pedal inputs and controls braking of wheels on landing gear.

FIG. 3 illustrates a more detailed schematic representation of the braking system 10 within the context of an aircraft. The braking system 10 is positioned to receive signals from the pilot pedals 65 and control braking of the wheels 69 of the wheel groups 60. The outboard and inboard BSCUs 20, 30 receive inputs from the pilot brake pedals 65. As illustrated in FIG. 3, pedal inputs from the first pilot brake pedals 65 are received by the outboard BSCU 20. Pedal inputs from the second pilot brake pedals 65 are received by the inboard BSCU 30. Additionally or alternatively, the BSCUs 20, 30 can receive different pedal inputs, such as each BSCU 20, 30 receiving one input from each pilot (e.g., BSCU 20 receives right pedal inputs from both pilots and BSCU 30 receives left pedal inputs from both pilots).

Each of the outboard and inboard BSCUs 20, 30 directly receives first signals, and indirectly receives second signals through the other BSCU 20, 30. As illustrated in FIG. 3, each pilot is provided with two brake pedals 65, such as a left brake pedal 65 and a right brake pedal 65. The pilot pedals 65 can include a first pair of pedals 65 provided for a first pilot (e.g., captain) and a second pair of pedals 65 provided for a second pilot (e.g., first officer). The pilots physically manipulate the pedals 65 to generate a pilot pedal physical input. The physical input of the first and second pilot pedals 65 are measured from their natural positions by sensors or equivalent components, converted into first and second pilot command control signals by transducers or equivalent components. Signals from the first pilot brake pedals 65 are received at the outboard BSCU 20 and signals from the second pilot brake pedals 65 at the inboard BSCU 30.

Figure 4:
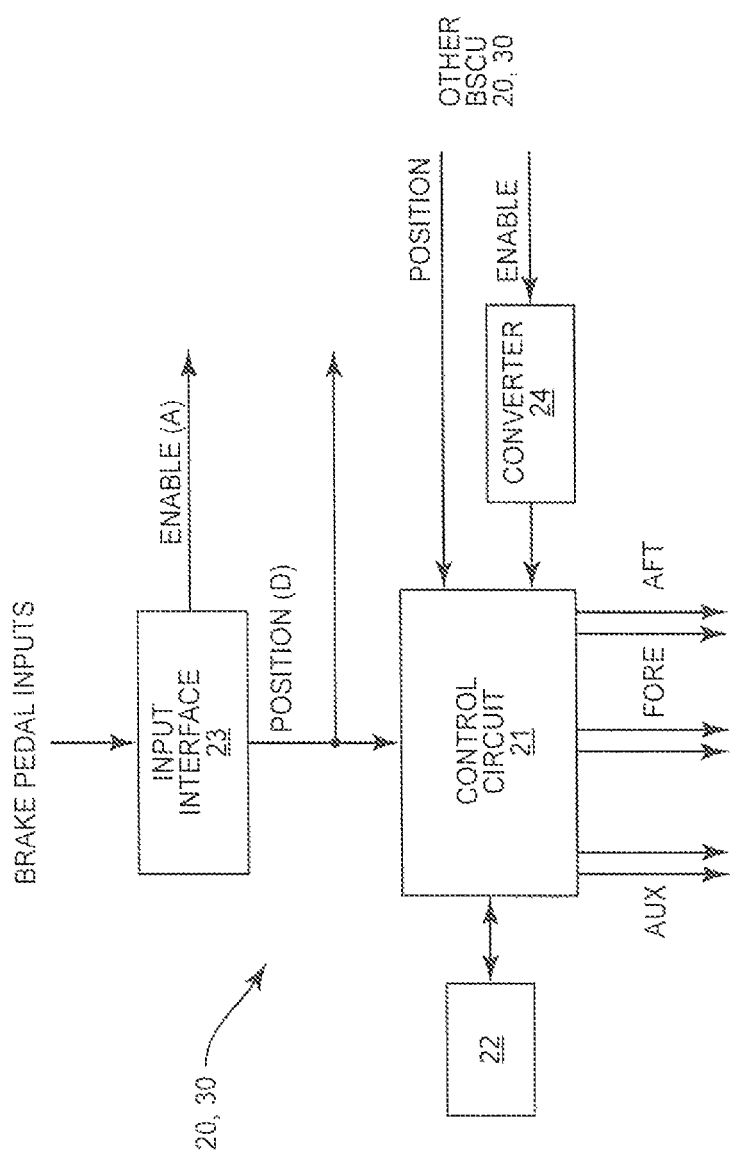
FIG. 4 is a schematic diagram of one of an inboard brake system control unit or an outboard brake system control unit.

The inboard and outboard BSCUs 20, 30 are configured to receive the signals from the brake pedals 65, process the signals, and control valves in the hydraulic system 40. Each of the inboard and outboard BSCUs 20, 30 can be the same and include the same components as illustrated in FIG. 4. Each of the inboard and outboard BSCUs 20, 30 includes a processing circuit 21 with one or more general-purpose and/or dedicated processors, including (but not limited to) one or more microprocessors, microcontrollers, application-specific integrated circuits (ASICs), field-programmable gate arrays (FPGAs), digital signal processors (DSPs), and/or other circuitry configured with appropriate software and/or firmware to control the various components according to program instructions stored in a memory circuit 22. The memory circuit 22 stores processing logic, programming code, and operational information for use by the processing circuit 21. The memory circuit 22 can include volatile memory, non-volatile memory, or both, according to various embodiments.

Each BSCU 20, 30 includes a shared control lane that has an independent enable circuit which provides power to the hydraulic enable solenoids to control shut-off valves 47 within the hydraulic braking system. The circuit can also control alternate brake command drivers that are isolated valve driver circuits that select the lesser of two normal system brake commands.

An input interface 23 is configured to receive pilot inputs over a wired connection, such as a serial, USB, micro USB, FIREWIRE, Lightning, and/or Thunderbolt connection. The input interface 23 can also be configured to receive the pilot inputs via wireless radio, electrical, and/or optical signals.

The input interface 23 can also receive signals from one or more other sources, such as a flight controller that oversees operations of the aircraft. Each BSCU 20, 30 can include a digital-to-analog converter 24 to convert the digital enable signal.

As illustrated in FIG. 4, each of the outboard and inboard BSCUs 20, 30 initially receives input signals from certain ones of the brake pedals 65. An analog signal based on the received digital signal is sent to the opposing BSCU 20, 30 indicating activation of the brake pedals 65. Digital position signals are also received indicating the position of the brake pedals 65 and extent that the pilots apply braking. As illustrated in FIG. 4, each BSCU 20, 30 shares with the other the analog enable signal indicating activation of the brake pedals and a digital position signal indicating the extent to which the pedals have been activated by the pilots. Thus, each BSCU 20, 30 is able to analyze each of the brake signals.

Each BSCU 20, 30 analyzes the inputs and selects the greater of the two pilot pedal inputs. The greater of the two pilot brake commands is selected to apply the brakes 50 using first brake modules 41 of the hydraulic system 40. The lesser of the two forward or aft brake commands is used for alternate braking using alternate brake modules 42.

As illustrated in FIG. 3, each BSCU 20, 30 includes two independent control lanes to control servo-valves 46 in the first brake modules 41. The outboard BSCU 20 includes a first control lane 91 that pairs the brakes 50 of the forward outboard pair of wheels 69a, 69b and a second control lane 92 that pairs the brakes 50 of the aft outboard wheels 69c, 69d. Likewise, a first control lane 93 from the inboard BSCU 30 pairs the brakes 50 of the forward inboard wheels 69e, 69f, and a second control lane 94 pairs the brakes 50 of the aft inboard wheels 69g, 69h.

Each BSCU 20, 30 also includes shared controlled lanes to control the alternate braking. BSCU 20 includes shared control lane 95 that leads to the alternate brake modules 42 and likewise BSCU 30 includes shared control lane 96 that leads to the alternate brake modules 42.

Figure 5:
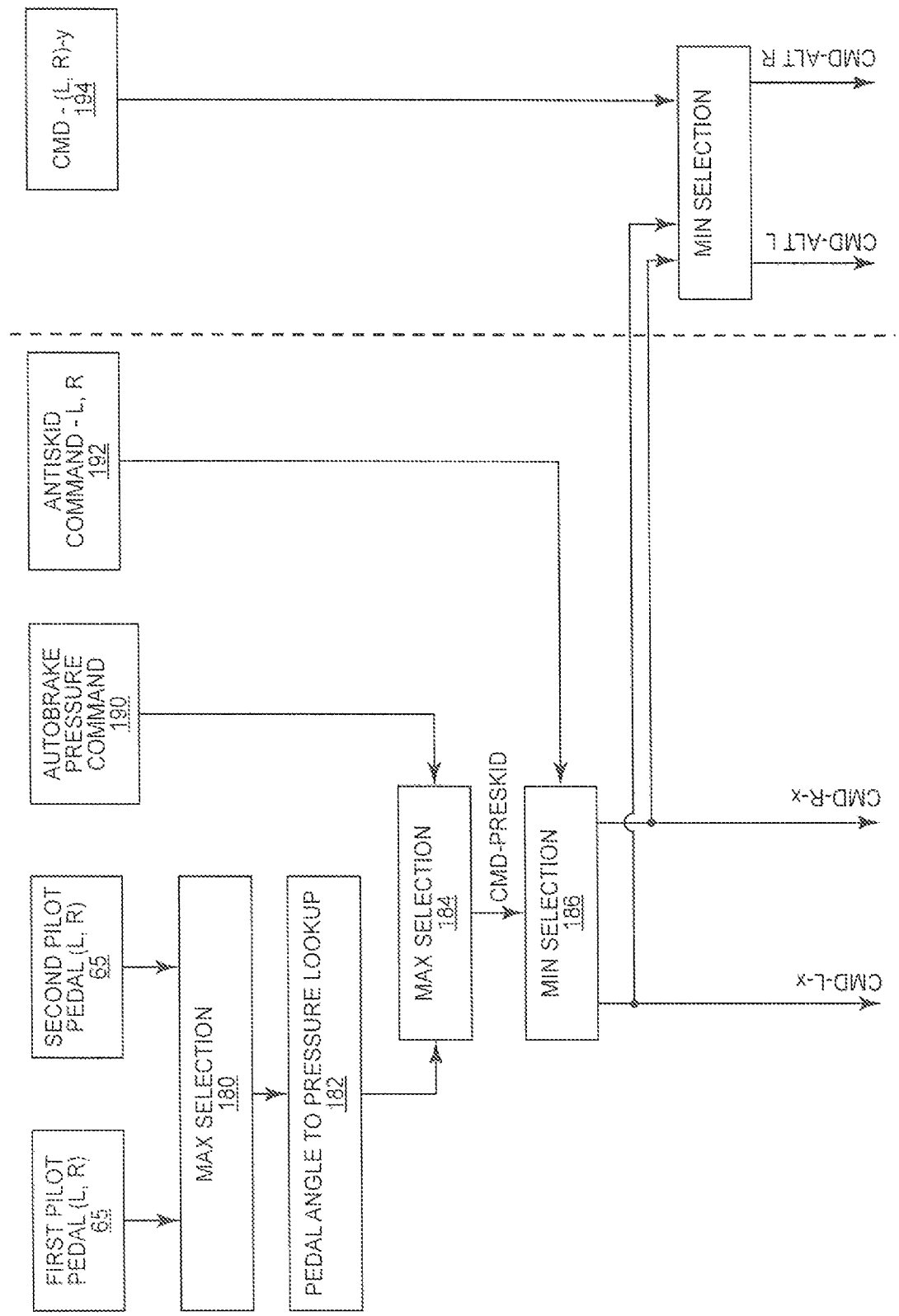
FIG. 5 is a schematic diagram for generating brake commands within a brake system control unit.

FIG. 5 illustrates brake command processing by each BSCU 20, 30. The brake pedal commands are received by the BSCUs 20, 30 that determine the greater of the two pilot braking signals (block 180). At below skid pressure, a brake pressure is determined based on the angle of pedal deployment (block 182). The brake pressure can be determined via a lookup table. The determined brake pressure is then compared with an autobrake pressure command (block 190) with the greater of the two being used to control the first brake modules 41 (block 184).

At braking pressure above the skid pressure, the brake command is generated via a normal antiskid function. An anti-skid command (block 192) causes a release in brake pressure (block 186) to prevent the skid with the braking commands sent to control the first brake modules 41.

For alternate braking, the lesser of the fore and aft brake commands are sent to the shared channel. The shared channel also receives the lesser of the fore-aft brake commands from the other BSCU 20, 30 (block 194). These signals are sent through the alternate control lanes to control the alternate brake modules 42.

The outboard BSCU 20 includes control lane 95 to the alternate brake modules 42 to control a servo-valve 46 that controls the brakes 50 of the outboard wheels 69a, 69c of the first wheel group 60, and a servo-valve 46 that controls the brakes 50 of the outboard wheels 69b, 69d of the second wheel group 60. The inboard BSCU 30 includes a control lane 96 for servo-valves 46 that control the brakes of the inboard wheels 69e, 69g of the first wheel set 60 and brakes 50 of the inboard wheels 69f, 69h of the second wheel set 60.

As illustrated in FIG. 3, the wheels set 60 of each landing gear share a first brake module 41. The single first brake module 41 includes servo-valves 46 that control braking on each of the wheels of the wheel group 60.

Figure 6:
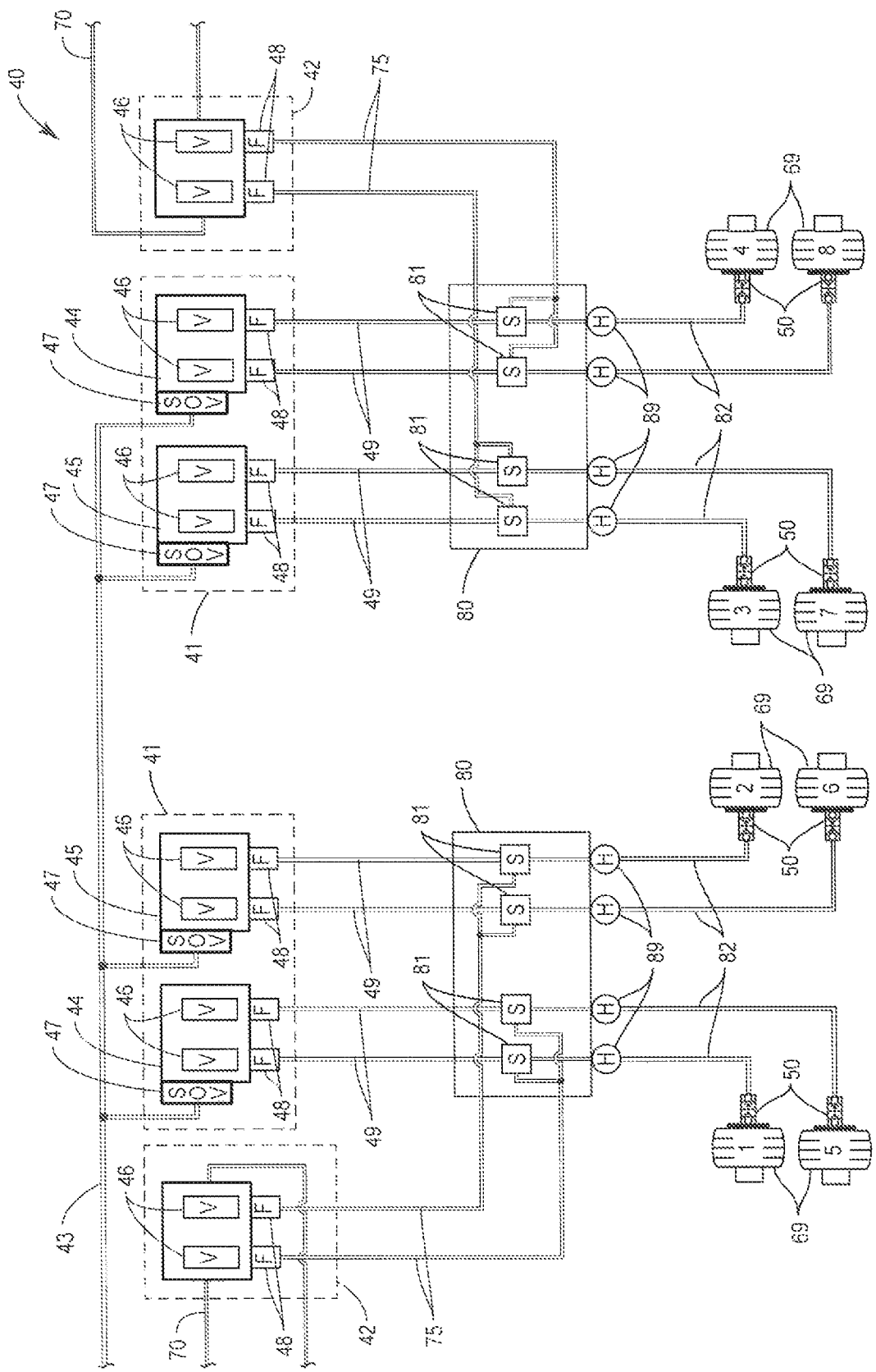
FIG. 6 is a schematic diagram of a hydraulic system.

The hydraulic system 40 as illustrated in FIGS. 3 and 6 includes the first brake modules 41 and alternate brake modules 42. The first brake modules 41 are supplied by hydraulic fluid through one or more first lines 43. The alternate brake modules 42 are supplied by hydraulic fluid through one or more second lines 70. These lines 43, 70 can include separate hydraulic fluid supplies to provide a redundant system in the event of a failure in one section of the hydraulic system 40. Hydraulic fluid can be supplied to the brakes 50 through the non-failing supply to ensure braking of the wheels 69.

Line 43 provides hydraulic fluid to the first brake modules 41 and line 70 provides hydraulic fluid to the alternate brake modules 42. Feed lines 49 extend from the first brake modules 41 to shuttle valve modules. Feed lines 75 extend from the alternate brake modules 42 to the shuttle valve modules 80. Feed lines 82 extend from the shuttle valve modules 80 to the brakes 50 of each of the wheels 69.

The first brake modules 41 each include an outboard section 44 and an inboard section 45. The outboard section 44 includes a servo-valve 46 associated with the brakes 50 of each outboard wheel 69 of a wheel group 60. The inboard section 45 includes a servo-valve 46 associated with the brakes 50 of each inboard wheel 69 of the wheel group 60. The servo-valves 46 of the outboard section 44 are controlled by the outboard BSCU 20, and the servo-valves 46 of the inboard section 45 are controlled by the inboard BSCU 30. Fuses 48 are located along the lines 49 to prevent the depletion of a hydraulic system for a downstream leak. Each of the outboard section 44 and the inboard section 45 include a shut-off valve 47 to reduce leakage of hydraulic fluid. The shut-off valves 47 can also prevent single thread failures from inadvertently braking the wheels 69.

The alternate brake modules 42 include pairs of servo-valves 46. A first servo-valve 46 is associated with a first line 75 through which hydraulic fluid is supplied to the pair of outboard brakes 50, and a second servo-valve 46 is associated with a second line 75 that supplies hydraulic fluid to the inboard brakes 50. Unlike the first brake modules 41 that include a servo-valve dedicated to each brake 50, the alternate brake modules 42 include a single servo-valve 46 for two brakes 50. For each alternate brake module 42, the servo-valve 46 associated with the outboard brakes 50 is controlled by the outboard BSCU 20 and the servo-valve 46 associated with the inboard brakes 50 is controlled by the inboard BSCU 30. Fuses 48 are positioned along each of the lines 75 to prevent depletion of a hydraulic system for a downstream leak. The alternate brake modules 42 can include shut-off valves 47 to prevent the flow of hydraulic fluid as illustrated in FIG. 3.

The shuttle valve modules 80 include a shuttle valve 81 associated with each of the brakes 50. Each shuttle valve 81 joins the hydraulic line 49 from the first brake module 41 and line 75 from the alternate brake module 42. Each of the shuttle valves 81 allow for hydraulic fluid to flow through it from one of these lines 49, 75 and into line 82 to control the associated brake 50. Hydraulic pressure sensors 89 that detect the fluid pressure can be positioned at various locations along the hydraulic system 40. This can include a pressure sensor 89 positioned along each of the lines 82 as illustrated in FIG. 5.

The hydraulic system 40 includes sets of supply lines that each supply hydraulic fluid to control braking of one of the wheels 69. Each set includes lines 49, 75, 82, and one or more of valves 46, 47, 81. Each set also includes a brake 50 to apply a braking force to one of the wheels 69.

The outboard BSCU 20 generates brake control signals in response to pilot input to control two sets of lines that include the valves 46, 47, 81 of a first wheel pair of just the outboard fore wheels 69 and two sets of lines that include the valves 46, 47, 81 of a second wheel pair of just the outboard aft wheels 69. The inboard BSCU 30 generates brake control signals in response to pilot input to control two sets of lines that include the valves 46, 47, 81 of a third wheel pair of just the inboard fore wheels 69 and two sets of lines that include the valves 46, 47, 81 of a fourth wheel pair of just the inboard aft wheels 69.

Figure 7:
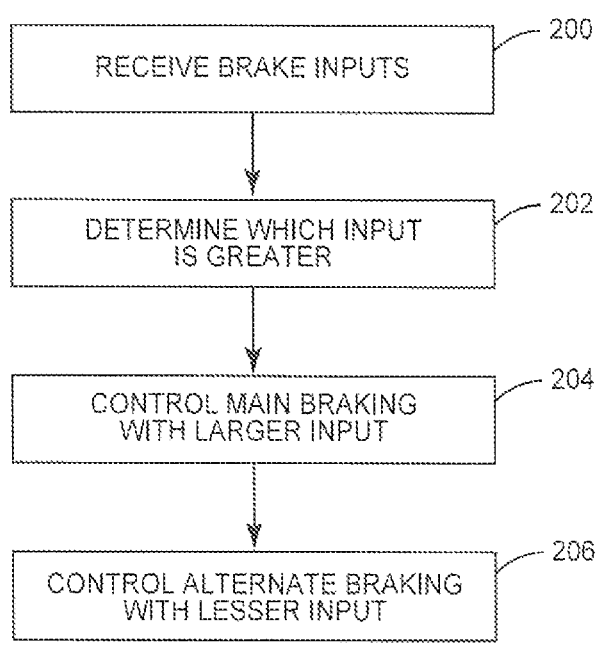
FIG. 7 is a flowchart diagram of a method of braking an aircraft.

The braking system 10 is configured to receive brake inputs from the pilots and apply a corresponding braking force. FIG. 7 illustrates a method of braking an aircraft. Initially, brake inputs are received from the brake pedals 65 (block 200). This can include inputs from two or more pilots. Further, this can include one or more inputs from each of the pilots. In the embodiment of FIG. 3, the brake inputs include a pair of inputs from each of two pilots.

The braking inputs are received from the pilots at the BSCUs 20, 30. The BSCUs 20, 30 calculate which pilot input is greater (block 202). This can include each BSCU 20, 30 calculating the extent of each pilot input based on different pedal input. In FIG. 3, this includes the outboard BSCU 20 determining the extent of the inputs based on a first set of pedal inputs from each pilot and the outboard BSCU 30 determining the extent of inputs based on a second set of pilot inputs. The BSCUs 20, 30 can share their calculations and each determines the greatest input. The determination of the extent of pilot input can also be calculated in other manners.

Once the greater input is determined, the BSCUs 20, 30 use the greater pilot input to control the first brake modules 41 and control braking (block 204). For example, if the captain inputs are greater than the first officer, the pilot inputs will be used to control braking using the first brake modules 41. This includes the outboard BSCU 20 sending braking commands to the servo-valves 46 of the first brake modules 41 associated with the outboard wheels 69. This also includes the inboard BSCU 30 sending braking commands to the servo-valves 46 of the first brake modules 41 associated with the inboard wheels 69. These commands provide for braking of the aircraft.

The lesser of the brake command between the fore and aft wheel pair are used for alternate braking (block 206). This includes sending braking commands from the BSCU 20 to the servo-valves 46 of the alternate brake modules 42 associated with the outboard wheels 69 and from the BSCU 30 to the servo-valves 46 associated with the inboard wheels 69.

The braking system described above also provides for braking of the aircraft in the event of failure of one of the BSCUs 20, 30. In this event, the operational BSCU 20, 30 is able to control braking to stop the aircraft.

The braking system 10 can be used in a variety of different aircraft. One aircraft includes a commercial aircraft that includes rows of seats each configured to accommodate a passenger. Other aircraft include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A braking system for a dual landing gear aircraft comprising left and right landing gears each with fore and aft inboard wheels and fore and aft outboard wheels, the braking system comprising:
   an outboard brake system control unit comprising at least a first processing circuit that generates brake control signals to symmetrically control braking of a first wheel pair comprising just the outboard fore wheels and a second wheel pair comprising just the outboard aft wheels in response to pilot input;
   an inboard brake system control unit comprising at least a second processing circuit that generates brake control signals to symmetrically control braking of a third wheel pair comprising just the inboard fore wheels and a fourth wheel pair comprising just the inboard aft wheels in response to the pilot input, the inboard brake system control unit being independent from the outboard brake system control unit; and
   a hydraulic system that applies braking forces to the wheels in response to the brake control signals;
   wherein the outboard brake system control unit transmits the brake control signals along a first control lane to brake just the outboard fore wheels of both the left and right landing gears and transmits the brake control signals along a second control lane to brake just the outboard aft wheels of both the left and right landing gears, the first control lane being independent from the second control lane.

2. The braking system of claim 1, wherein the inboard brake system control unit transmits the brake control signals along a third control lane to brake just the inboard fore wheels of both the left and right landing gears and transmits the brake control signals along a fourth control lane to brake just the inboard aft wheels of both the left and right landing gears, the third control lane being independent from the fourth control lane.

3. The braking system of claim 1, wherein the inboard and outboard braking system control units further comprise input interfaces that receive the pilot input with the pilot input comprising separate first and second inputs.

4. The braking system of claim 1, wherein the hydraulic system comprises:
   first hydraulic lines and alternate lines that supply hydraulic fluid to brakes at the wheels;
   servo-valves positioned along the first hydraulic lines and the alternate lines to modulate a pressure of the hydraulic fluid supplied to the brakes in response to the brake control signals received from the outboard and inboard brake system control units;
   shuttle valves that operatively connect the first hydraulic lines and the alternate lines, the shuttle valves supply hydraulic fluid from one of the first hydraulic lines and the alternate lines.

5. The braking system of claim 4, wherein each of the servo-valves positioned along the first hydraulic lines modulate pressure to one of the brakes and the servo-valves positioned along the alternate supply lines modulate pressure to a pair of the brakes on one of the left and right landing gears.

6. The braking system of claim 4, further comprising a first module that houses each of the servo-valves that modulate the pressure of the hydraulic fluid along the first hydraulic lines to the brakes of one of the left and right landing gears and a second module that houses each of the servo-valves that modulate the pressure of the hydraulic fluid along the second hydraulic lines to the brakes of the other of the left and right landing gears.

7. The braking system of claim 6, wherein each of the first and second modules comprise a shut-off valve to reduce leakage of the hydraulic fluid.

8. The braking system of claim 4, wherein the outboard brake system control unit controls the servo-valves that supply hydraulic fluid to each of the fore and aft outboard wheels and the inboard brake system control unit controls the servo-valves that supply hydraulic fluid to each of the fore and aft inboard wheels.

9. The braking system of claim 1, wherein each of the outboard brake system control unit and the inboard brake system control unit receives pilot control signals from pilot brake pedals.

10. The braking system of claim 1, wherein each of the outboard brake system control unit and the inboard brake system control unit include components that are the same.

11. An aircraft having a braking system according to claim 1.

12. A braking system for a dual landing gear aircraft comprising left and right landing gears each with fore and aft inboard wheels and fore and aft outboard wheels, the braking system comprising:
   a hydraulic system comprising sets of supply lines that each supply hydraulic fluid to control braking of one of the wheels, each of the sets of supply lines comprising:
   a plurality of valves;
   a brake to apply a braking force to one of the wheels;
   an outboard brake system control unit comprising a first processing circuit that generates brake control signals to control the valves of a first wheel pair comprising just the outboard fore wheels and the valves of a second wheel pair comprising just the outboard aft wheels in response to pilot input; and
   an inboard brake system control unit comprising a second processing circuit that generates brake control signals to control the valves of a third wheel pair comprising just the inboard fore wheels and the valves of a fourth wheel pair comprising just the inboard aft wheels;
   the outboard and inboard brake system control units that receives pilot input and control the valves of each of the wheel pairs to apply a symmetrical braking force to the wheels of each of the wheel pairs;
   wherein each of the inboard and outboard brake system control units receive the pilot input from both first and second pilots.

13. The braking system of claim 12, further comprising:
   a first control lane that extends between the outboard brake system control unit and one of the valves on one of the supply lines of the outboard fore wheels;
   a second control lane that extends between the outboard brake system control unit and one of the valves on one of the supply lines of the outboard aft wheels;
   a third control lane that extends between the inboard brake system control unit and one of the valves on one of the supply lines of the inboard fore wheels; and a fourth control lane that extends between the inboard brake system control unit and one of the valves on one of the supply lines of the inboard aft wheels;

each of the control lanes being independent of each other.

14. The braking system of claim 12, wherein the hydraulic system comprises a first hydraulic supply line and an alternate hydraulic supply line and each of the supply lines further comprises a shuttle valve to selectively deliver the hydraulic fluid to the brakes from one of the first hydraulic supply line and the alternate hydraulic supply line based on the pilot input.

15. A method of braking an aircraft comprising:

receiving pilot input at both an outboard brake system control unit and an inboard brake system control unit;

based on the pilot input, sending first braking signals from the outboard brake system control unit and symmetrically braking a first pair of fore outboard wheels of a right landing gear and a left landing gear and a second pair of aft outboard wheels on the right landing gear and the left landing gear; and based on the pilot input, sending second braking signals from the inboard brake system control unit and symmetrically braking a third pair of fore inboard wheels of the right landing gear and the left landing gear and a fourth pair of aft inboard wheels on the right landing gear and the left landing gear;

determining from the pilot input a greater of a first input and a second input and based on the greater of the first and second inputs sending the first braking signals from the outboard brake system control unit and symmetrically braking the first and second pairs of outboard wheels and based on the greater of the first and second inputs sending the second braking signals from the inboard brake system control unit and symmetrically braking the third and fourth pairs of inboard wheels.

16. The method of claim 15, further comprising sending the first braking signals to the first pair of fore outboard wheels from the outboard brake system control unit via a first control lane and sending the first braking signals from the outboard brake system control unit to the second pair of aft outboard wheels via an independent second control lane.

17. The method of claim 16, further comprising sending the second braking signals to the third pair of fore inboard wheels from the inboard brake system control unit via a third control lane and sending the second braking signals from the inboard brake system control unit to the fourth pair of aft inboard wheels from the inboard brake system control unit via an independent fourth control lane.

18. The method of claim 15, further comprising determining from the pilot input a lesser of a brake command between a forward and aft wheel pair and controlling alternate braking based on the lesser of the brake command between the forward and aft wheel pair.

19. The method of claim 15, further comprising sending the braking signals to servo-valves and adjusting a flow of hydraulic fluid and adjusting the braking of the pairs of brakes.

20. The method of claim 15, wherein receiving the pilot input at both an outboard brake system control unit and an inboard brake system control unit comprises receiving pedal inputs from pilot pedals.

* * * * *